(No Model.)
I. A. F. BANG & M. C. A. RUFFIN.
PROCESS OF PURIFYING ACETIC ACID.
No. 401,992. Patented Apr. 23, 1889.
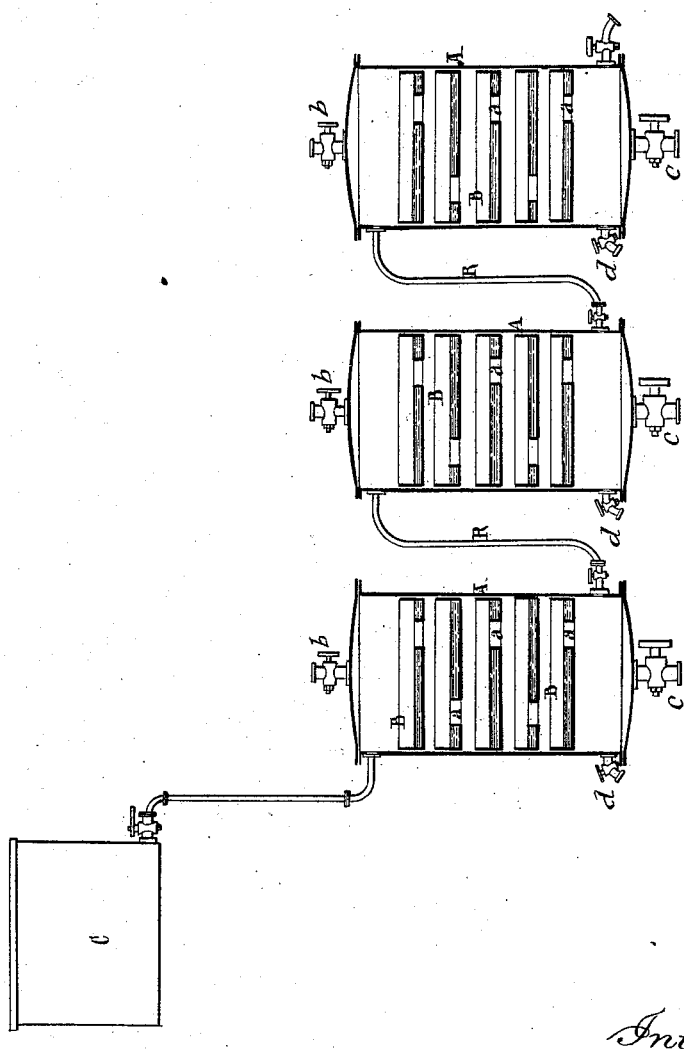

UNITED STATES PATENT OFFICE.

IVAR AXEL FERDINAND BANG AND MARIE CHARLES ALFRED RUFFIN, OF PARIS, FRANCE.

PROCESS OF PURIFYING ACETIC ACID.

SPECIFICATION forming part of Letters Patent No. 401,992, dated April 23, 1889.

Application filed December 19, 1888. Serial No. 294,105. (No specimens.) Patented in France July 25, 1885, No. 170,313, and in Belgium July 25, 1885, No. 69,711.

*To all whom it may concern:*

Be it known that we, IVAR AXEL FERDINAND BANG and MARIE CHARLES ALFRED RUFFIN, both of Paris, France, have invented certain new and useful Improvements in Methods of Purifying Acetic Acid, (for which we have obtained patents in France, No. 170,313, dated July 25, 1885, and in Belgium, No. 69,711, dated July 25, 1885,) of which the following specification is a full, clear, and exact description.

A great part of the acetic acid employed in the arts or consumed as a condiment is extracted from the acetates (more or less pure) obtained from pyroligneous acid, which is a secondary product of the distillation of wood. These acetic acids always contain variable quantities of tarry matters of a very complex nature, which communicate to the acid an offensive taste and odor, and often give it a decided yellow coloring. Up to this time it has been deemed impossible to get rid of these impurities entirely, at least in a practical or industrial manner. By the process herein described it is easy to obtain from the impure contaminated by the pyroligneous principles an acid pure and of good flavor.

Our process is based upon the discovery that certain liquids which do not mix with acetic acid may by repeated intimate contact therewith dissolve and carry off all the odoriferous and coloring matters which contaminate the acid. Among the liquids referred to are hydrocarbons, in general those obtained from the essence of petroleum, or the benzine series. Other agents are, however, suitable for the purpose, as hereinafter set forth. These hydrocarbons may be subjected to a preliminary purification and rendered inodorous by known means, such as repeated washings with concentrated sulphuric acid. By bringing the crude acetic acid into intimate contact with hydrocarbon thus refined, or by violent agitation, an emulsion will be formed, the hydrocarbon not being soluble in acid. Then by allowing the liquid to rest, the hydrocarbon, which is much lighter than the acid, rises to the surface, carrying with it all or a great portion of the impurities. This treatment may be repeated until the acid becomes entirely pure.

The intimate contact necessary to effect the purification may be accomplished in various ways—for example, we introduce a variable quantity of crude acid into a vessel of a material not acted upon by the acid. We then add one to two per cent. of hydrocarbon, or sometimes more, according to the quality of the acid, and then a violent agitation is produced by a mechanical beater, or otherwise. After a sufficient time the agitation is arrested, when the hydrocarbon quickly rises to the surface, carrying with it in solution a greater part of the tarry matters which give it a dark color and repulsive odor. The hydrocarbon is then drawn off, as by a cock placed at the proper height, and an equal quantity of pure hydrocarbon is introduced. The operation is repeated in the same manner until the hydrocarbon vaporizing on a sheet of paper leaves no odor, which is a sure indication that the acid no longer contains any infectious matter.

Instead of proceeding as above, an apparatus such as illustrated in the accompanying drawing may be used.

A series of vessels, A, of a material not affected by the acid, are arranged close together, forming a battery, and are filled with hydrocarbon. Each vessel contains a number of pans or trays, B, provided each with a small flanged opening, *a*. The acid is admitted to the first vessel from an upper reservoir, C. It traverses this vessel, flowing from one pan to the next below through the openings *a*, and then rises through pipe R to the top of the next vessel, passing through it in the same manner, and so on until the last vessel is reached and a perfect purification effected. Of course any desired number of vessels may be used.

All the vessels A are provided with an inlet-opening at the top closed by a valve, *b*, with a discharge-cock, *c*, at the bottom, and with a smaller testing-cock, *d*.

It will be readily understood that with the same apparatus the operation may be carried on inversely—*i. e.*, the crude acid may be put in first and the hydrocarbon passed through it. In this case, however, the hydrocarbon ought to enter each vessel from below and pass out above. Moreover, in this case the pans B become useless and may be discarded.

The hydrocarbons charged with the tarry matters which they have taken from the acetic acid are collected and subjected to a regenerating process to fit them for reuse. The regeneration may be effected by treatment with concentrated sulphuric acid or caustic soda; or they can be purified by distillation.

We have found that the process of purification may be effectively carried on by the use of chlorides or sulphides of carbon or chloroform, or by a mixture of these bodies, instead of using the hydrocarbons above specified. In some cases the crude acetic acid is so very impure as to require a great number of washings and the use of large quantities of the purifying agent. In such case we first remove from the acid a large portion of the impurities in the following manner.

We blow through the mass of acetic acid for a number of hours air in a fine state of division for the purpose of oxidizing the tarry matters and forming resinous compounds. This treatment by blowing air through the acid is always an appropriate preliminary step. We then distill the acid thus treated in the ordinary manner, the resinous matters remaining as a residuum in the still, and the acid which has been distilled off is now ready for treatment, as above described, being freed of the excess of impurities.

We claim—

1. The process of purifying crude acetic acid containing pyroligneous matter, which process consists in bringing such acid in a liquid state into intimate contact with a carbon compound, such as specified, which will not mix with the acid, whereby the said impurities are dissolved, and then separating the acid from the purifying agent and the impurities which it has absorbed, substantially as described.

2. In the process of purifying acetic acid containing pyroligneous matter, the improvement consisting in bringing the same while in a liquid state into contact with a hydrocarbon of the benzine series, whereby the said impurities are dissolved, substantially as described.

3. The process of purifying crude acetic acid by first blowing air through the same and thereby forming resinous compounds, distilling off the acid, and completing the purification by bringing the acid into intimate contact with a carbon compound (such as herein specified) which will not mix with the acid, substantially as described.

In testimony whereof we have signed this specification in the presence of two subscribing witnesses.

IVAR AXEL FERDINAND BANG.
MARIE CHARLES ALFRED RUFFIN.

Witnesses:
EUGENE DUBOIS,
R. J. PRESTON.